US012645694B2

(12) United States Patent
Ghosh et al.

(10) Patent No.: US 12,645,694 B2
(45) Date of Patent: Jun. 2, 2026

(54) SYSTEMS AND METHODS FOR DETERMINING HISTORICALLY SIMILAR INCIDENTS USING MULTIVARIATE EMBEDDINGS

(71) Applicant: Fidelity Information Services, LLC, Jacksonville, FL (US)

(72) Inventors: Ranadhir Ghosh, St. Johns, FL (US); John Platais, Menomonee Falls, WI (US); Anup Patel, Bangalore (IN)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 18/791,269

(22) Filed: Jul. 31, 2024

(65) Prior Publication Data

US 2026/0037533 A1     Feb. 5, 2026

(51) Int. Cl.
*G06F 16/25*      (2019.01)
*G06F 16/22*      (2019.01)

(52) U.S. Cl.
CPC ........ *G06F 16/258* (2019.01); *G06F 16/2237* (2019.01)

(58) Field of Classification Search
CPC ............................ G06F 16/258; G06F 16/2237
USPC ......................................................... 707/741
See application file for complete search history.

(56) References Cited

U.S. PATENT DOCUMENTS 12,111,797 B1 *  10/2024  Lum ................. G06F 16/24544
12,164,664 B1 *  12/2024  Dupont ............... G06F 21/6227

12,210,839 B1 *   1/2025  Burton .................... G06F 40/30
2019/0347282 A1  11/2019  Cai et al.
2021/0398137 A1  12/2021  Liu et al.
2022/0277242 A1   9/2022  Sahni et al.
2023/0245011 A1   8/2023  Tiwari et al.
2024/0078376 A1 *  3/2024  Li .......................... G06F 16/583
2024/0354320 A1 * 10/2024  Procter ................. G06F 40/103
2024/0386015 A1 * 11/2024  Crabtree ............. G06F 16/9024
2024/0406166 A1 * 12/2024  Bell ....................... G06N 3/045

(Continued)

OTHER PUBLICATIONS

International Search Report and Written Opinion issued in International Application No. PCT/US2025/029582, issued Aug. 5, 2025 (8 pages).

*Primary Examiner* — Giovanna B Colan
(74) *Attorney, Agent, or Firm* — Bookoff McAndrews, PLLC

(57)                ABSTRACT

A method for finding historically similar incidents is disclosed. The method includes receiving a plurality of historical data objects corresponding to a plurality of previous incidents, each of the plurality of historical data objects indicating an occurrence of a previous incident and including previous incident multivariate information; converting the historical data objects to a plurality of historical embeddings; storing the plurality of historical embeddings in an index, the index being a vector embedding database; receiving a data object indicating an occurrence of a current incident associated with a configurable item, the data object including multivariate information; converting the data object into a first embedding by utilizing the large language model; identifying a set of historically similar incidents by applying a Euclidean distance formula to the first embedding and the plurality of historical embeddings; and determining a similarity score for each of the set of historically similar incidents.

20 Claims, 8 Drawing Sheets

(56)  References Cited

U.S. PATENT DOCUMENTS

| 2024/0412720 | A1* | 12/2024 | Vasylyev | .......... | G06F 16/90332 |
| 2024/0428008 | A1* | 12/2024 | Abraham | ................ | G06F 40/35 |
| 2025/0094538 | A1* | 3/2025 | Wan | ................. | G06F 16/24578 |
| 2025/0156463 | A1* | 5/2025 | Rosa | ................... | G06F 16/3344 |
| 2025/0272314 | A1* | 8/2025 | Melamed | .............. | G06F 16/313 |

* cited by examiner

185

200

202    Receive Incident Data

204    Process Incident Data

206    Generate Embedding

208    Index Embedding

300

302 — Determine Features

304 — Format Feature Text

306 — Perform Text PreProcessing

400

402 — Receive Incident Data

404 — Process Incident Data

406 — Generate Embedding

408 — Determined Nearest Embeddings in Index

410 — Compute Similarity Score

500

502  504  506  508    510

ABC

ABC

ABC 512  514    516    518

XYZ    AAA

ABC    AAA

ABC    AAA

FIG. 5

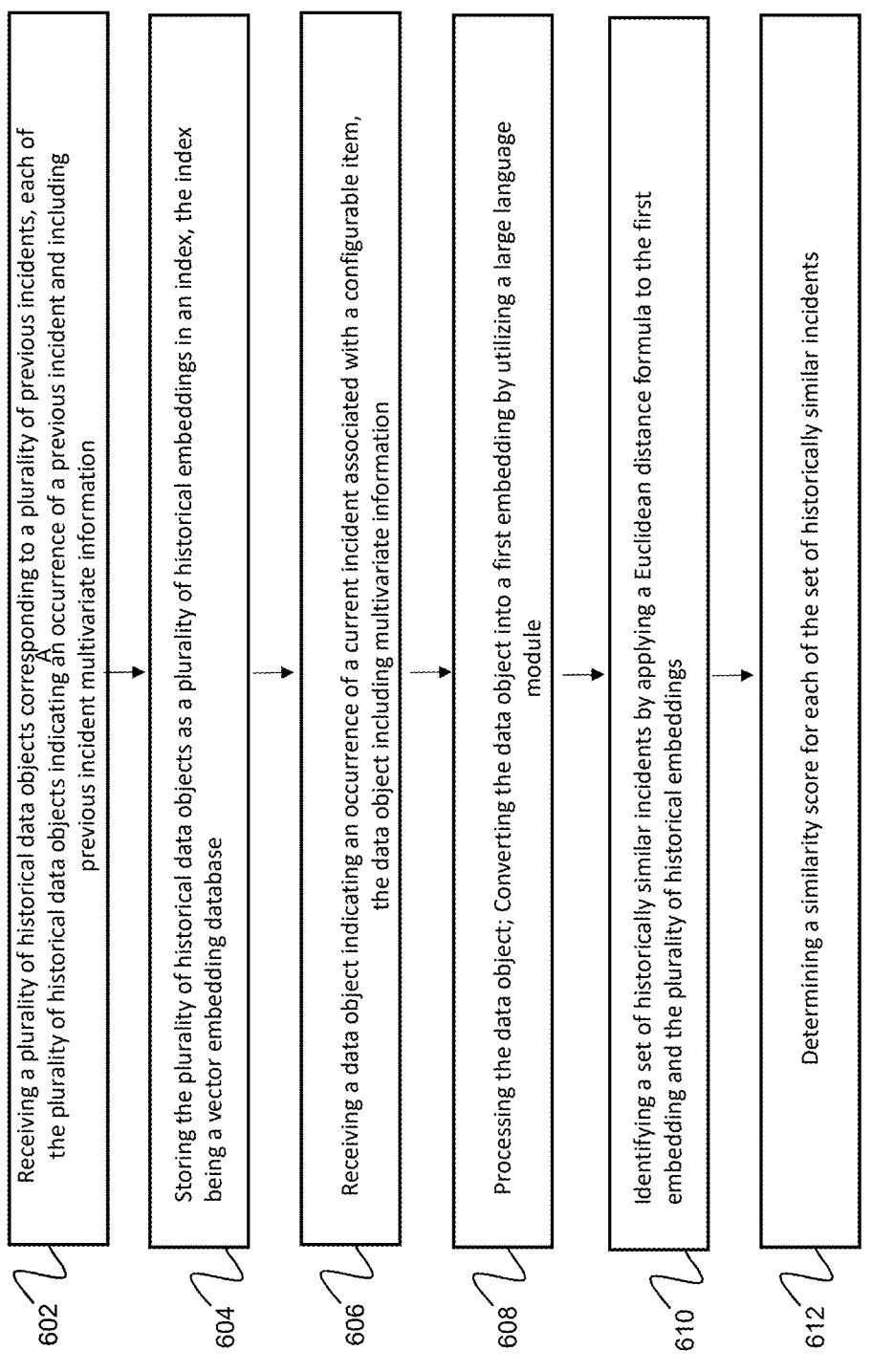

602 Receiving a plurality of historical data objects corresponding to a plurality of previous incidents, each of the plurality of historical data objects indicating an occurrence of a previous incident and including previous incident multivariate information 604 Storing the plurality of historical data objects as a plurality of historical embeddings in an index, the index being a vector embedding database 606 Receiving a data object indicating an occurrence of a current incident associated with a configurable item, the data object including multivariate information 608 Processing the data object; Converting the data object into a first embedding by utilizing a large language module 610 Identifying a set of historically similar incidents by applying a Euclidean distance formula to the first embedding and the plurality of historical embeddings 612 Determining a similarity score for each of the set of historically similar incidents

FIG. 6

SYSTEMS AND METHODS FOR DETERMINING HISTORICALLY SIMILAR INCIDENTS USING MULTIVARIATE EMBEDDINGS

TECHNICAL FIELD

Various embodiments of the present disclosure relate generally to information technology (IT) management systems and, more particularly, to systems and methods for determining historically similar incidents using multivariate embeddings.

BACKGROUND

In computing systems, for example computing systems that perform financial services and electronic payment transactions, programing changes may occur. For example, software may be updated. Changes in the system may lead to incidents, defects, issues, bugs or problems (collectively referred to as incidents) within the system. These incidents may occur at the time of a software change or at a later time. These incidents may be costly for the company as users may not be able to use the services and due to resources expended by the company to resolve the incidents.

These incidents in the system may need to be examined and resolved in order to have the software services perform correctly. Time may be spent by, for example, incident resolution teams, determining what issues arose within the software services. The faster an incident may be resolved, the less potential costs a company may incur. Thus, promptly identifying and fixing such incidents (e.g., writing new code or updating deployed code) may be important to a company.

Incidents within a system may be related and may repeat themselves from time to time. Identifying a previous incident that was similar to a current incident may lead to an incident being resolved more quickly (e.g., updates performed by the previous issue may be utilized to address the new issue). Many existing computing systems do not have the ability to find historically similar incidents in order to analyze new incidents. The present disclosure is directed to addressing this and other drawbacks to the existing computing system incident analysis techniques.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In some aspects, the techniques described herein relate to a computer-implemented method for finding historically similar incidents in a system, the method including: receiving a plurality of historical data objects corresponding to a plurality of previous incidents, each of the plurality of historical data objects indicating an occurrence of a previous incident and including previous incident multivariate information; processing the plurality of historical data objects; converting the plurality of processed historical data objects to a plurality of historical embeddings by utilizing a large language model; storing the plurality of historical embeddings in an index, the index being a vector embedding database; receiving a data object indicating an occurrence of a current incident associated with a configurable item, the data object including multivariate information; processing the data object; converting the data object into a first embedding by utilizing the large language model; identifying a set of historically similar incidents by applying a Euclidean distance formula to the first embedding and the plurality of historical embeddings; and determining a similarity score for each of the set of historically similar incidents based on the application of the Euclidean distance formula.

In some aspects, the techniques described herein relate to a computer-implemented method, wherein the multivariate information includes a short description, a business category, a business sub-category, a line of business, and an incident priority.

In some aspects, the techniques described herein relate to a computer-implemented method, wherein the multivariate information includes multiple data types, the data types including integers and free field text.

In some aspects, the techniques described herein relate to a computer-implemented method, wherein processing the data object includes: formatting the multivariate information into a first string; and performing preprocessing on the first string.

In some aspects, the techniques described herein relate to a computer-implemented method, wherein performing preprocessing on the first string includes applying one or more of a lower casing algorithm, a tokenization algorithm, a punctuation mark removal algorithm, a stop word removal algorithm, a stemming algorithm, or a lemmatization algorithm.

In some aspects, the techniques described herein relate to a computer-implemented method, wherein the similarity score is determined by applying exponential decay function to an output of the Euclidean distance formula for the set of historically similar incidents.

In some aspects, the techniques described herein relate to a computer-implemented method, further including: applying a normalizing algorithm to the similarity scores; comparing the similarity scores to a threshold value; determining a list of historically similar incidents with similarity scores greater than the threshold value; and outputting the list of historically similar incidents to a user via a graphical user interface (GUI).

In some aspects, the techniques described herein relate to a system for finding historically similar incidents in a system, the system including: a memory having processor-readable instructions stored therein; and at least one processor configured to access the memory and execute the processor-readable instructions to perform operations including: receiving a plurality of historical data objects corresponding to a plurality of previous incidents, each of the plurality of historical data objects indicating an occurrence of a previous incident and including previous incident multivariate information; processing the plurality of historical data objects; converting the plurality of processed historical data objects to a plurality of historical embeddings by utilizing a large language model; storing the plurality of historical embeddings in an index, the index being a vector embedding database; receiving a data object indicating an occurrence of a current incident associated with a configurable item, the data object including multivariate information; processing the data object; converting the data object into a first embedding by utilizing the large language model; identifying a set of historically similar incidents by applying a Euclidean distance formula to the first embedding and the plurality of historical embeddings; and determining a similarity score for each of the set of historically similar incidents based on the application of the Euclidean distance formula.

In some aspects, the techniques described herein relate to a system, wherein the multivariate information includes a short description, a business category, a business sub-category, a line of business, and an incident priority.

In some aspects, the techniques described herein relate to a system wherein the multivariate information includes multiple data types, the data types including integers and free field text.

In some aspects, the techniques described herein relate to a system, wherein processing the data object includes: formatting the multivariate information into a first string; and performing preprocessing on the first string.

In some aspects, the techniques described herein relate to a system, wherein performing preprocessing on the first string includes applying one or more of a lower casing algorithm, a tokenization algorithm, a punctuation mark removal algorithm, a stop word removal algorithm, a stemming algorithm, or a lemmatization algorithm.

In some aspects, the techniques described herein relate to a system, wherein the similarity score is determined by applying exponential decay function to an output of the Euclidean distance formula for the set of historically similar incidents.

In some aspects, the techniques described herein relate to a system, further including: applying a normalizing algorithm to the similarity scores; comparing the similarity scores to a threshold value; determining a list of historically similar incidents with similarity scores greater than the threshold value; and outputting the list of historically similar incidents to a user via a graphical user interface (GUI).

In some aspects, the techniques described herein relate to a non-transitory computer readable medium storing processor-readable instructions which, when executed by at least one processor, cause the at least one processor to perform operations including: receiving a plurality of historical data objects corresponding to a plurality of previous incidents, each of the plurality of historical data objects indicating an occurrence of a previous incident and including previous incident multivariate information; processing the plurality of historical data objects; converting the plurality of processed historical data objects to a plurality of historical embeddings by utilizing a large language model; storing the plurality of historical embeddings in an index, the index being a vector embedding database; receiving a data object indicating an occurrence of a current incident associated with a configurable item, the data object including multivariate information; processing the data object; converting the data object into a first embedding by utilizing the large language model; identifying a set of historically similar incidents by applying a Euclidean distance formula to the first embedding and the plurality of historical embeddings; and determining a similarity score for each of the set of historically similar incidents based on the application of the Euclidean distance formula.

In some aspects, the techniques described herein relate to a non-transitory computer readable medium, wherein the multivariate information includes a short description, a business category, a business sub-category, a line of business, and an incident priority.

In some aspects, the techniques described herein relate to a non-transitory computer readable medium, wherein processing the data object includes: formatting the multivariate information into a first string; and performing preprocessing on the first string.

In some aspects, the techniques described herein relate to a non-transitory computer readable medium, wherein performing preprocessing on the first string includes applying one or more of a lower casing algorithm, a tokenization algorithm, a punctuation mark removal algorithm, a stop word removal algorithm, a stemming algorithm, or a lemmatization algorithm.

In some aspects, the techniques described herein relate to a non-transitory computer readable medium, wherein the similarity score is determined by applying exponential decay function to an output of the Euclidean distance formula for the set of historically similar incidents.

In some aspects, the techniques described herein relate to a non-transitory computer readable medium further including: applying a normalizing algorithm to the similarity scores; comparing the similarity scores to a threshold value; determining a list of historically similar incidents with similarity scores greater than the threshold value; and outputting the list of historically similar incidents to a user via a graphical user interface (GUI).

BRIEF DESCRIPTION OF THE DRAWINGS

The accompanying drawings, which are incorporated in and constitute a part of this specification, illustrate several embodiments and together with the description, serve to explain the principles of the disclosure.

FIG. 5 depicts an exemplary output of historically similar incidents, according to one or more embodiments.

FIG. 6 depicts a flowchart of a method for determining historically similar incidents, according to one or more embodiments.

DETAILED DESCRIPTION OF EMBODIMENTS

Figure 1A:
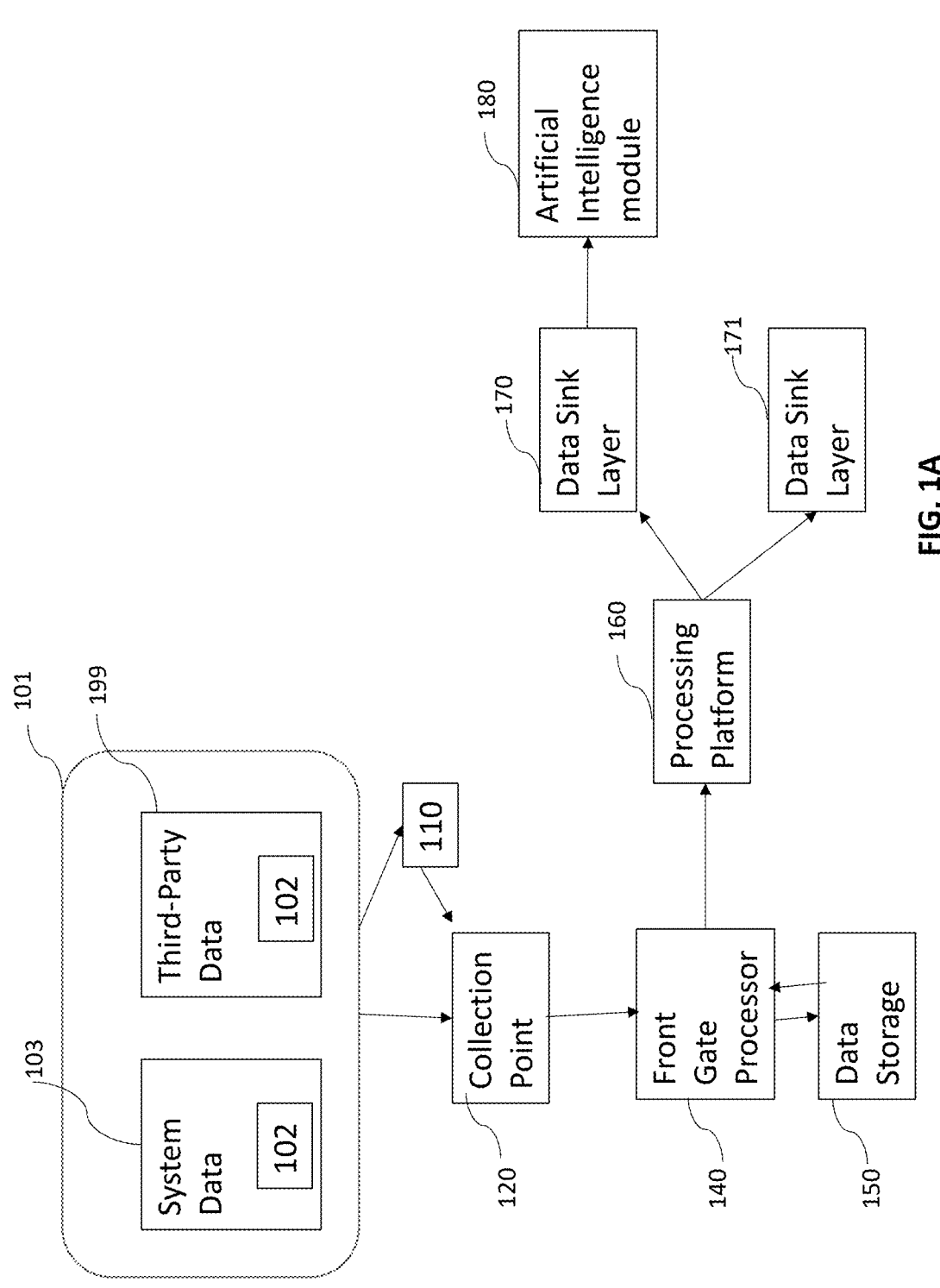
FIG. 1A depicts an exemplary system overview for a data pipeline for an artificial intelligence model to predict and troubleshoot incidents in a system, according to one or more embodiments.

Various embodiments relate to information technology (IT) management systems and, more particularly, to systems and methods for determining historically similar incidents by using multivariate embeddings.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Software companies have been struggling to avoid outages from incidents that may be caused by upgrading software or hardware components, or changing a member of a team, for example. The system described herein may be configured to analyze and/or process event data for an IT system. The system described herein may, for example, receive a stream of event data over periods of time. Event data may include, but is not limited to: (1) an incident, (2) an alert, (3) change data, (4) a problem, and/or (5) anomaly.

An incident may be an occurrence that can disrupt or cause a loss of operation, services, or functions of a system. Incidents may be manually reported by customers or personnel, may be automatically logged by internal systems, or may be captured in other ways. An incident may occur from factors such as hardware failure, software failure, software bugs, human error, and/or cyber attacks. Deploying, refactoring, or releasing software code may, for example, cause an incident. An incident may be detected during, for example, an outage or a performance change. An incident may include characteristics, where an incident characteristic may refer to the quality or traits associated with an incident. For example, incident characteristics may include, but is not limited to, the severity of an incident, the urgency of an incident, the complexity of an incident, the scope of an incident, the cause of an incident, and/or what configurable item corresponds to the incident (e.g., what systems/platforms/products etc. are affected by the incident), how it is described in freeform text, what business segment is effected, what category/subcategory is affected, and/or what assigned group is the incident.

An alert may refer to a notification that informs a system or user of an event. An alert may include a collection of events representing a deviation from normal behavior for a system. For example, an alert may include metadata including a short field description that includes free from text fields (e.g., a summary of the alert), first occurrences, time stamps, an alert key, etc. Understanding the different types of alerts within a system from various perspectives may assist in resolving incidents.

Change data may refer to information that describes a modification made to data within a system or database. Change data may track the changes that occur over one or more periods of time. Problem data may refer to any data that causes issues or impedes a system's normal operations. Anomaly data may refer to data that indicates a deviation of a system from a standard or normal operation.

Event data may be associated with one or more configurable items (CIs). A configurable item (CI) may refer a component of a system that can be identified as a self-contained unit for purposes of change control and identification. For example, a particular application, service, particular product, or server, may be defined by a CI.

For example, an information technology (IT) management system may receive incidents (e.g., data objects indicating occurrences of incidents) at invariable rates throughout the day. When incidents are received, it may be unclear as to how a particular incident relates to previous incidents. Better understanding the relationship between received incidents, in comparison to similar past incidents, may assist a user or a system in identifying and potentially addressing incidents for a system.

Processing a vast amount of information, such as incidents, to produce meaningful and actionable insights in IT operations may be valuable to organizations. As IT management systems utilize sophisticated tools and sensors, billions of data points may be received and information overload may become an issue to be resolved. The systems and methods described herein may enable identification of historically similar incidents to provide additional insights. The historically similar incidents may help a user to better understand the relationships between various incidents and may provide insights into potential solutions.

As discussed above, identifying and resolving current incidents in a system may be crucial to fixing and/or most efficiently running a system. Identifying and analyzing solutions to similar incidents may assist a user and/or system in determining a solution to a current incident. Current systems may not be capable of accurately and efficiently finding similar historical incidents.

Conventional systems may determine historically similar incidents by computing a similarity score based on an incident's description. But, only utilizing a description of an incident may limit the ability to identify historically similar incidents based on other aspects (e.g., features) of an incident.

One or more embodiments described herein may provide event data correlation (e.g., for incidents). For example, the system described herein may assign historical event data with a "similarity score" that scores how similar previous historical event data is as compared to a received individual event (e.g., an incident). Configuration Item (CI) event data correlation and insight into root may significantly enhance incident response capabilities. The system described herein may offer real time access to relevant data and advanced analysis in real time. This may, for example, enhance incident response capabilities (i.e., reduce response time, minimize the impact on business operations, and improve overall efficiency). The system described herein may be configured to determine and output one or more historically similar incidents.

Advantageously, one or more embodiments may describe a system implementing a multivariate approach (e.g., considering a plurality of features in identifying similar past incidents). This approach my take into consideration not only the short description of an incident, but also additional relevant data points included with a particular incident (e.g., the short description, the business category, the business sub-category, the line of business, and the incident priority). By incorporating more than just the description, more accurate similar historical incidents may be identified. For example, the by incorporating multivariate factors in the determined historically similar incidents, an approximately 15% improvement in similarity scores may be achieved by the system described herein.

One or more embodiments may allow for various types of data processing in order to identify correlations, similarity, and root causes, and recommend a corrective action based on received data as well as user feedback mechanisms. One or more embodiments may be extended to clients and users of services and software with applications that are connected to the system described herein.

FIG. 1A depicts an exemplary system overview for a data pipeline for an artificial intelligence model to analyze IT data and determine historically similar incidents, according to one or more embodiments. The data pipeline system 100 may be a platform with multiple interconnected components. The data pipeline system 100 may include one or more servers, intelligent networking devices, computing devices, components, and corresponding software for aggregating and processing data.

As shown in FIG. 1A, a data pipeline system 100 may include a data source 101, a collection point 120, a secondary collection point 110, a front gate processor 140, data storage 150, a processing platform 160, a data sink layer 170, a data sink layer 171, and an artificial intelligence module 180.

The data source 101 may include in-house data 103 and third party data 199. The in-house data 103 may be a data source directly linked to the data pipeline system 100. Third party data 199 may be a data source connected to the data pipeline system 100 externally as will be described in greater detail below.

Both the in-house data 103 and third party data 199 of the data source 101 may include incident data 102. Incident data 102 may include incident reports with information for each incident provided with one or more of an incident number, closed date/time, category, close code, close note, long description, short description, root cause, or assignment group. Incident data 102 may include incident reports with information for each incident provided with one or more of an issue key, description, summary, label, issue type, fix version, environment, author, or comments. Incident data 102 may include incident reports with information for each incident provided with one or more of a file name, script name, script type, script description, display identifier, message, committer type, committer link, properties, file changes, or branch information. Incident data 102 may include one or more of real-time data, market data, performance data, historical data, utilization data, infrastructure data, or security data. These are merely examples of information that may be used as data, and the disclosure is not limited to these examples.

Incident data 102 may be generated automatically by monitoring tools that generate alerts and incident data to provide notification of high-risk actions, failures in IT environment, and may be generated as tickets. Incident data may include metadata, such as, for example, text fields, identifying codes, and time stamps.

The in-house data 103 may be stored in a relational database including an incident table. The incident table may be provided as one or more tables, and may include, for example, one or more of problems, tasks, risk conditions, incidents, or changes. The relational database may be stored in a cloud. The relational database may be connected through encryption to a gateway. The relational database may send and receive periodic updates to and from the cloud. The cloud may be a remote cloud service, a local service, or any combination thereof. The cloud may include a gateway connected to a processing API configured to transfer data to the collection point 120 or a secondary collection point 110. The incident table may include incident data 102.

The data pipeline system 100 may include third party data 199 generated and maintained by third party data producers. Third party data producers may produce incident data 102 from Internet of Things (IoT) devices, desktop-level devices, and sensors. Third party data producers may include but are not limited to Tryambak, Appneta, Oracle, Prognosis, ThousandEyes, Zabbix, ServiceNow, Density, Dyatrace, etc. The incident data 102 may include metadata indicating that the data belongs to a particular client or associated system.

The data pipeline system 100 may include a secondary collection point 110 to collect and pre-process the incident data 102 from the data source 101. The secondary collection point 110 may be utilized prior to transferring data to a collection point 120. The secondary collection point 110 may for example be an Apache Minifi software. In one example, the secondary collection point 110 may run on a microprocessor for a third party data producer. Each third party data producer may have an instance of the secondary collection point 110 running on a microprocessor. The secondary collection point 110 may support data formats including but not limited to JSON, CSV, Avro, ORC, HTML, XML, and Parquet. The secondary collection point 110 may encrypt incident data 102 collected from the third party data producers. The secondary collection point 110 may encrypt incident data, including, but not limited to, Mutual Authentication Transport Layer Security (mTLS), HTTPs, SSH, PGP, IPsec, and SSL. The secondary collection point 110 may perform initial transformation or processing of incident data 102. The secondary collection point 110 may be configured to collect data from a variety of protocols, have data provenance generated immediately, apply transformations and encryptions on the data, and prioritize data.

The data pipeline system 100 may include the collection point 120. The collection point 120 may be a system configured to provide a secure framework for routing, transforming, and delivering data across from the data source 101 to downstream processing devices (e.g., a front gate processor 140). The collection point 120 may for example be a software such as Apache NiFi. The collection point 120 may receive raw data and the data's corresponding fields such as the source name and ingestion time. The collection point 120 may run on a Linux Virtual Machine (VM) on a remote server. The collection point 120 may include one or more nodes. For example, the collection point 120 may receive incident data 102 directly from the data source 101. In another example, the collection point 120 may receive the incident data 102 from the secondary collection point 110. The secondary collection point 110 may transfer the incident data 102 to the collection point 120 using, for example, Site-to-Site protocol. The collection point 120 may include a flow algorithm. The flow algorithm may connect different processors, as described herein, to transfer and modify data from one source to another. For each third party data producer, the collection point 120 may have a separate flow algorithm. Each flow algorithm may include a processing group. The processing group may include one or more processors. The one or more processors may, for example, fetch the incident data 102 from the relational database. The one or more processors may utilize the processing API of the in-house data 103 to make an API call to a relational database to fetch incident data 102 from the incident table. The one or more processors may further transfer the incident data 102 to a destination system such as a front gate processor 140. The collection point 120 may encrypt data through HTTPS, Mutual Authentication Transport Layer Security (mTLS), SSH, PGP, IPsec, and/or SSL, etc. The collection point 120 may support data formats including but not limited to JSON, CSV, Avro, ORC, HTML, XML, and Parquet. The collection point 120 may be configured to write messages to clusters of a front gate processor 140 and communication with the front gate processor 140.

The data pipeline system 100 may include a distributed event streaming platform such as the front gate processor 140. The front gate processor 140 may be connected to and configured to receive data from the collection point 120. The front gate processor 140 may be implemented in an Apache Kafka cluster software system. The front gate processor 140 may include one or more message brokers and corresponding nodes. The message broker may for example be an intermediary computer program module that translates a message from the formal messaging protocol of the sender to the formal messaging protocol of the receiver. The message broker may be on a single node in the front gate processor 140. A message broker of the front gate processor 140 may run on a virtual machine (VM) on a remote server. The collection point 120 may send the incident data 102 to one or more of the message brokers of the front gate processor 140. Each message broker may include a topic to store similar categories of incident data 102. A topic may be an ordered log of events. Each topic may include one or more sub-topics. For example, one sub-topic may store the incident data 102 relating to network problems, and another sub-topic may store the incident data 102 related to security breaches from third party data producers. Each topic may further include one or more partitions. The partitions may be a systematic way of breaking the one topic log file into many logs, each of which can be hosted on a separate server. Each partition may be configured to store as much as a byte of the incident data 102. Each topic may be partitioned evenly between one or more message brokers to achieve load balancing and scalability. The front gate processor 140 may be configured to categorize the received data into a plurality of client categories, thereby forming a plurality of datasets associated with the respective client categories. These data-sets may be stored separately within the storage device as described in greater detail below. The front gate processor 140 may further transfer data to storage and to processors for further processing.

For example, the front gate processor 140 may be configured to assign particular data to a corresponding topic. Alert sources may be assigned to an alert topic, and the incident data 102 may be assigned to an incident topic. Change data may be assigned to a change topic. Problem data may be assigned to a problem topic.

The data pipeline system 100 may include a software framework for data storage 150. The data storage 150 may be configured for long term storage and distributed processing. The data storage 150 may be implemented using, for example, Apache Hadoop. The data storage 150 may store the incident data 102 transferred from the front gate processor 140. In particular, the data storage 150 may be utilized for distributed processing of the incident data 102, and Hadoop distributed file system (HDFS) within the data storage may be used for organizing communications and storage of the incident data 102. For example, the HDFS may replicate any node from the front gate processor 140. This replication may protect against hardware or software failures of the front gate processor 140. The processing may be performed in parallel on multiple servers simultaneously.

The data storage 150 may include an HDFS that is configured to receive the metadata (e.g., incident data). The data storage 150 may further apply an algorithm to process the data. This processing may allow for parallel processing of large data sets. This algorithm may be implemented by a MapReduce algorithm, for example. The data storage 150 may further aggregate and store the data. Algorithms within data storage 150 may be used for cluster resource manage-ment and planning tasks of the stored data. The algorithm may, for example, be Yet Another Resource Negotiation (YARN). For example, a cluster computing framework, such as the processing platform 160, may be arranged to further utilize the HDFS of the data storage 150. For example, if the data source 101 stops providing data, the processing plat-form 160 may be configured to retrieve data from the data storage 150 either directly or through the front gate proces-sor 140. The data storage 150 may allow for the distributed processing of large data sets across clusters of computers using programming models. The data storage 150 may include a master node and an HDFS for distributing pro-cessing across a plurality of data nodes. The master node may store metadata such as the number of blocks and their locations. The main node may maintain the file system namespace and regulate client access to said files. The main node may comprise files and directories and perform file system executions such as naming, closing, and opening files. The data storage 150 may scale up from a single server to thousands of machines, each offering local computation and storage. The data storage 150 may be configured to store the incident data 102 in an unstructured, semi-structured, or structured form. In one example, the plurality of datasets associated with the respective client categories may be stored separately. The master node may store the metadata such as the separate dataset locations.

The data pipeline system 100 may include a real-time processing framework, e.g., a processing platform 160. In one example, the processing platform 160 may be a distrib-uted dataflow engine that does not have its own storage layer. For example, this may be the software platform Apache Flink. In another example, the software platform Apache Spark may be utilized. The processing platform 160 may support stream processing and batch processing. Stream processing may be a type of data processing that performs continuous, real-time analysis of received data. Batch processing may involve receiving discrete data sets processed in batches. The processing platform 160 may include one or more nodes. The processing platform 160 may aggregate incident data 102 (e.g., incident data 102 that has been processed by the front gate processor 140) received from the front gate processor 140. The processing platform 160 may include one or more operators to transform and process the received data. For example, a single operator may filter the incident data 102 and then connect to another operator to perform further data transformation. The pro-cessing platform 160 may process incident data 102 in parallel. A single operator may be on a single node within the processing platform 160. The processing platform 160 may be configured to filter and only send particular processed data to a particular data sink layer. For example, depending on the data source of the incident data 102 (e.g., whether the data is in-house data 103 or third party data 199), the data may be transferred to a separate data sink layer (e.g., the data sink layer 170, or the data sink layer 171). Further, additional data that is not required at downstream modules (e.g., at the artificial intelligence module 180) may be filtered and excluded prior to transferring the data to a data sink layer.

The processing platform 160 may perform three functions. First, the processing platform 160 may perform data validation. The data's value, structure, and/or format may be matched with the schema of the destination (e.g., the data sink layer 170). Second, the processing platform 160 may perform a data transformation. For example, a source field, target field, function, and parameter from the data may be extracted. Based upon the extracted function of the data, a particular transformation may be applied. The transformation may reformat the data for a particular use downstream. A user may be able to select a particular format for downstream use. Third, the processing platform 160 may perform data routing. For example, the processing platform 160 may select the shortest and/or most reliable path to send data to a respective sink layer (e.g., the data sink layer 170 and/or the data sink layer 171).

In one example, the processing platform 160 may be configured to transfer particular sets of data to a data sink layer (e.g., the data sink layer 170 and/or the data sink layer 171). For example, the processing platform 160 may receive input variables for a particular artificial intelligence module 180. The processing platform 160 may then filter the data received from the front gate processor 140 and only transfer data related to the input variables of the artificial intelligence module 180 to a data sink layer (e.g., the data sink layer 170 and/or the data sink layer 171).

The data pipeline system 100 may include the one or more data sink layers (e.g., data sink layer 170 and data sink layer 171). Incident data 102 processed from processing platform 160 may be transmitted to and stored in the data sink layer 170. In one example, the data sink layer 171 may be stored externally on a particular client's server. The data sink layer 170 and data sink layer 171 may be implemented using a software such as, but not limited to, PostgreSQL, HIVE, Kafka, OpenSearch, and Neo4j. The data sink layer 170 may receive in-house data 103, which have been processed and received from the processing platform 160. The data sink layer 171 may receive third party data 199, which have been processed and received from the processing platform 160. The data sink layers may be configured to transfer incident data 102 to an artificial intelligence module 180. The data sink layers (e.g., the data sink layer 170 and/or the data sink layer 171) may be data lakes, data warehouses, or cloud storage systems. Each data sink layer (e.g., the data sink layer 170 and/or the data sink layer 171) may be configured to store incident data 102 in both a structured or unstructured format. The data sink layer 170 may store incident data 102 with several different formats. For example, the data sink layer 170 may support data formats such as JavaScript Objection Notation (JSON), comma-separated value (CSV), Avro, Optimized Row Columnar (ORC), Hypertext Markup Language (HTML), Extensible Markup Language (XML), or Parquet, etc. The data sink layer (e.g., data sink layer 170 or data sink layer 171), may be accessed by one or more separate components. For example, the data sink layer may be accessed by a Non-structured Query language ("NoSQL") database management system (e.g., a Cassandra cluster), a graph database management system (e.g., Neo4j cluster), further processing programs (e.g., Kafka+Flink programs), and a relation database management system (e.g., postgres cluster). Further processing may thus be performed prior to the processed data being received by the artificial intelligence module 180.

The data pipeline system 100 may include the artificial intelligence module 180. The artificial intelligence module 180 may include a machine-learning component. The artificial intelligence module 180 may use the received data in order to train and/or use a machine learning model. The artificial intelligence module 180 may be, for example, a neural network. Nonetheless, it should be noted that other machine learning techniques and frameworks may be used by the artificial intelligence module 180 to perform the methods contemplated by the present disclosure. For example, the systems and methods may be realized using other types of supervised and unsupervised machine learning techniques such as regression problems, random forest, cluster algorithms, principal component analysis (PCA), reinforcement learning, or a combination thereof. The artificial intelligence module 180 may be configured to extract and receive data from the data sink layer 170.

Figure 1B:
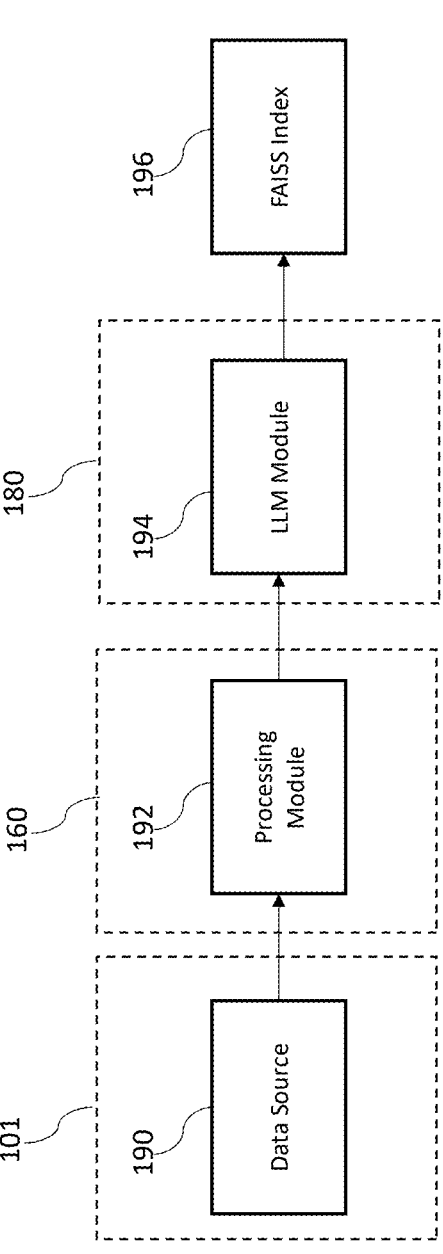
FIG. 1B depicts an exemplary system overview of aspects of the data pipeline for identifying historically similar incidents, according to one or more embodiments.

FIG. 1B depicts an exemplary system 185 overview of aspects of the data pipeline system 100 for identifying historically similar incidents, according to one or more embodiments.

System 185 may depict a data source 190 that may receive data from the data source 101. The data source 190 may, for example, receive new incidents and the corresponding multivariate data associated with an incident over a period of time. The multivariate information may include, but is not limited to, a short description, a business category, a business sub-category, a line of business, and an incident priority.

The system 185 may further include a processing module 192 that may be implemented by processing platform 160 configured to generate embeddings for the received incidents.

System 185 may further include an LLM (Large Language Model) module 194. The LLM module 194 may apply natural language processing (NLP). The LLM module 194 may be configured to perform embedding generation on received data. The LLM module 194 may, for example, be implemented by an artificial intelligence module 180. The LLM module 194 may utilize a pre-trained language model (e.g., a large language model). It may be a neural network that utilized a transformer architecture. The LLM module 194 may be configured to treat all received letters as uncased. The LLM module 194 may be retrained with updated training data at set intervals (e.g., once a month).

FIG. 1B may further include an index 196. The index 196 may be a vector database. The index 196 may be configured to employ techniques such as quantization, indexing, and efficient distance computation to store and process large-scale datasets. The index 196 may be configured to use vector representation of data points and to perform approximate nearest neighbor searches to find similar vectors. The index 196 may, for example, be the "Facebook AI Similarity Search" (FAISS) library.

Figure 2:
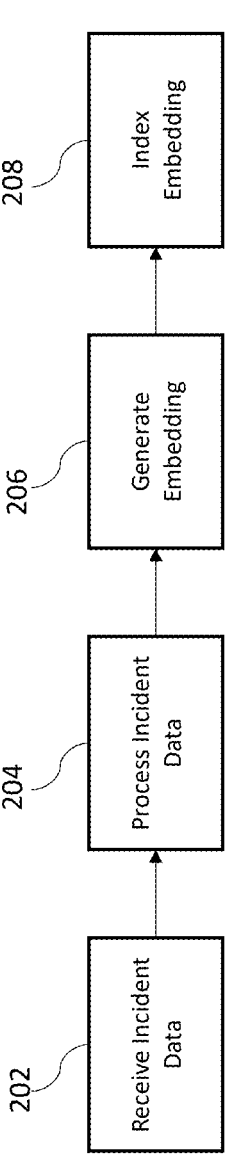
FIG. 2 depicts a flowchart of a method for embedding and storing incident data, according to one or more embodiments.

FIG. 2 depicts a flowchart of a method for embedding and storing incident data, according to one or more embodiments. The method described in FIG. 2 may be implemented by the data pipeline system 100 of FIG. 1A and/or by the system 185 of FIG. 1B.

At step 202, the system (e.g., the data source 190) may receive an incident and the corresponding data. The corresponding data may include multivariate data for a particular incident. The multivariate data may include, but are not limited to a description, a priority code, a business category, a business subcategory, and a line of business. The description may be a text field. The priority code may be represented as a variable or integer (e.g., a score of 1 to 5). The business category and sub-category may correspond to a list of business categories and sub-categories stored on the system. The line of business (LOB) may be a category, where the LOB may include association logic linking, a line of business with one or more of: business services, service offerings, applications, application instances or web services, and/or servers and services. The multivariate data may change over time. For example, additional fields of data such as "client priority" may be included.

An exemplary set of multivariates for an exemplary incident may be:

description—This is an incident

Priority—1

Business Category—Payment

Business Subcategory—Cross Border Payment

Line of Business—ABC

Figure 3:
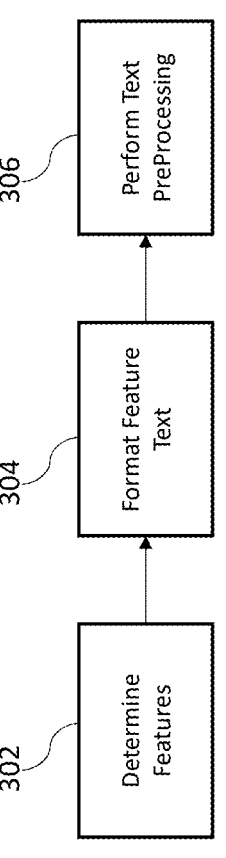
FIG. 3 depicts a flowchart of a method for processing incident data, according to one or more embodiments.

At step 204, the received incident and corresponding multivariates may be processed. FIG. 3 may depict a flowchart 300 of a method for processing incident data from step 204, according to one or more embodiments. The method may, for example, be implemented by the data pipeline system 100 of FIG. 1A and/or by the system 185 of FIG. 1B.

At step 302, the set of multivariates may first be extracted from the received incident. For example, all data points and the various formats may be extracted from the incident data.

At step 304, the received multivariates may be formatted for further processing (e.g., by the processing module 192). This may include converting all extracted data from step 302 to a string. Using the example above, the multivariates may be formatted/converted to the following:

"Description: This is an incident, Priority:1, Business Category: Payment, Business Subcategory: Cross Border Payment, Line of Business: ABC"

At step 306, text preprocessing algorithms may be performed on the output from step 304. Exemplary algorithms that may be applied include, but are not limited to, lower casing, tokenization, punctuation mark removal, stop word removal, stemming, and/or lemmatization algorithms. The lower casing algorithm may convert all uppercase characters to lower case. The tokenization algorithm may break the text (e.g., words, numbers, characters, etc.) into smaller unit (e.g., tokens). The output may be a list or sequences of tokens. The punctuation mark removal algorithm may be configured to find and remove any punctuation marks from the text. The stop word removal algorithm may identify and eliminate frequently occurring words with low semantic meaning. For example, this may include the removal of words such as "a", "the," "is," "in," etc. The stemming algorithm may reduce words to their base or root form. The algorithm may remove suffixes from term (e.g., the term running may be converted to "run). The Lemmatization algorithm may reduce words to their base or dictionary form. The algorithm may lever a morphological dictionary and map inflected words to their respective lemmas. The tokenization algorithm may be the last processing algorithm applied to the received multivariate data from step 304. The punctuation and stop removal algorithms may be applied first.

Step 306 and step 204 may, for example, convert the data into a format that may be converted to an embedding for further analysis. The algorithms may normalize words for further processing. At this time, the data may be a concatenated string.

At step 206, the processed data from step 204 may be converted to an embedding (e.g., by an LLM module 194).

Step 206 may be performed by statistical methods or by machine learning techniques. The system may preferably utilize machine learning techniques at this step. If a statistical method is applied, text may be represented by a vector where each vector corresponds to a particular words, and a value may represent the frequency at which a word is utilized. In another statistical approach, a term-frequency-inverse document frequency (TF-IDF) algorithm may be applied. If machine learning techniques are applied, word embeddings or sentence embeddings may be created by a machine learning module. For example, the LLM module 194 may be applied. The LLM module 194 may include stacked transformer encoder layers. The LLM module 194 may, for example, be a pretrained model such as a bert-base-uncased model. The LLM module may include token embeddings, positional embeddings, and/or segment embeddings. The token embeddings may assign a unique vector to each token. The positional embeddings may define the position of a word within a string. The LLM module 194 may generate an embedding for each received set of text from step 204 (e.g., a separate embedding may be created with the multivariate data from each respective incident).

At step 208, the generated embedding may be stored (e.g., in the index 196). This may allow for the embeddings to be compared at a later time. For example, similar incidents may be identified by applying Euclidean distances on the vector embeddings stored in the index. Over a period of time, the method 200 may store large amounts of embeddings for incident data for one or more data streams.

Figure 4:
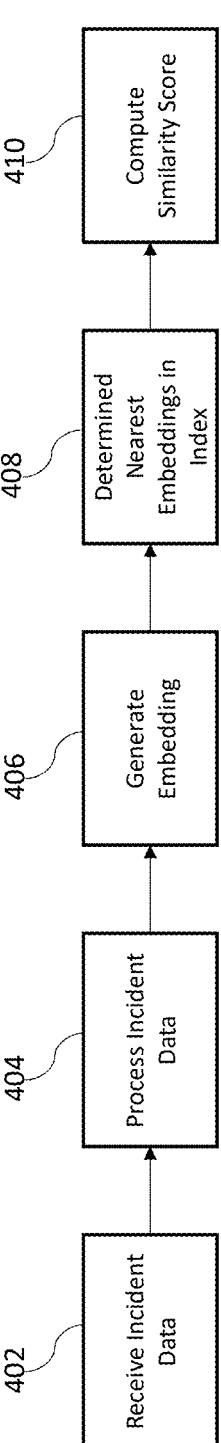
FIG. 4 depicts a flowchart of a method for determining historically similar incidents, according to one or more embodiments.

FIG. 4 depicts a flowchart of a method for determining historically similar incidents, according to one or more embodiments. The method may, for example, be implemented by the data pipeline system 100 of FIG. 1A and/or by the system 185 of FIG. 1B.

At step 402, the system (e.g., the data source 190) may receive an incident and corresponding data. Step 402 may include all aspects of step 202.

At step 404, the received incident data may be processed. Step 404 may include all aspects of step 204.

At step 406, an embedding may be generated for the processed incident data from step 404. Step 406 may generate an embedding utilizing the techniques described at step 206. The generated embedding may then be stored and indexed.

At step 408, the system may utilize the index 196 to perform an algorithm to identify a set of historical embeddings (represented as embeddings in the index) closest to the inputted incident from step 402. This may, for example, be performed by applying a Euclidean distance formula. The approach may generate similar incidents expeditiously, e.g., in microseconds. The system may then determine a set of the nearest embeddings stored within the index. For example, the system may identify and save a predetermined number of embeddings closest to the received incident based on the application of the Euclidean distance formula.

At step 410, a similarity score may be calculated for each of the identified embeddings from step 408. The similarity score may be determined by applying exponential decay on the nearest distances calculated at step 408. A normalizing algorithm may be applied on the scores. The system may then be configured to compare the generated scores to a threshold value. If the scores are greater than the threshold values, the embeddings and their respective incidents may be saved and output. The similarity score may be output with additional information from the determined historically similar incidents. The historically similar incidents may be output to a user via a graphical user interface (GUI). An exemplary output may be depicted in FIG. 5.

Figure 5:
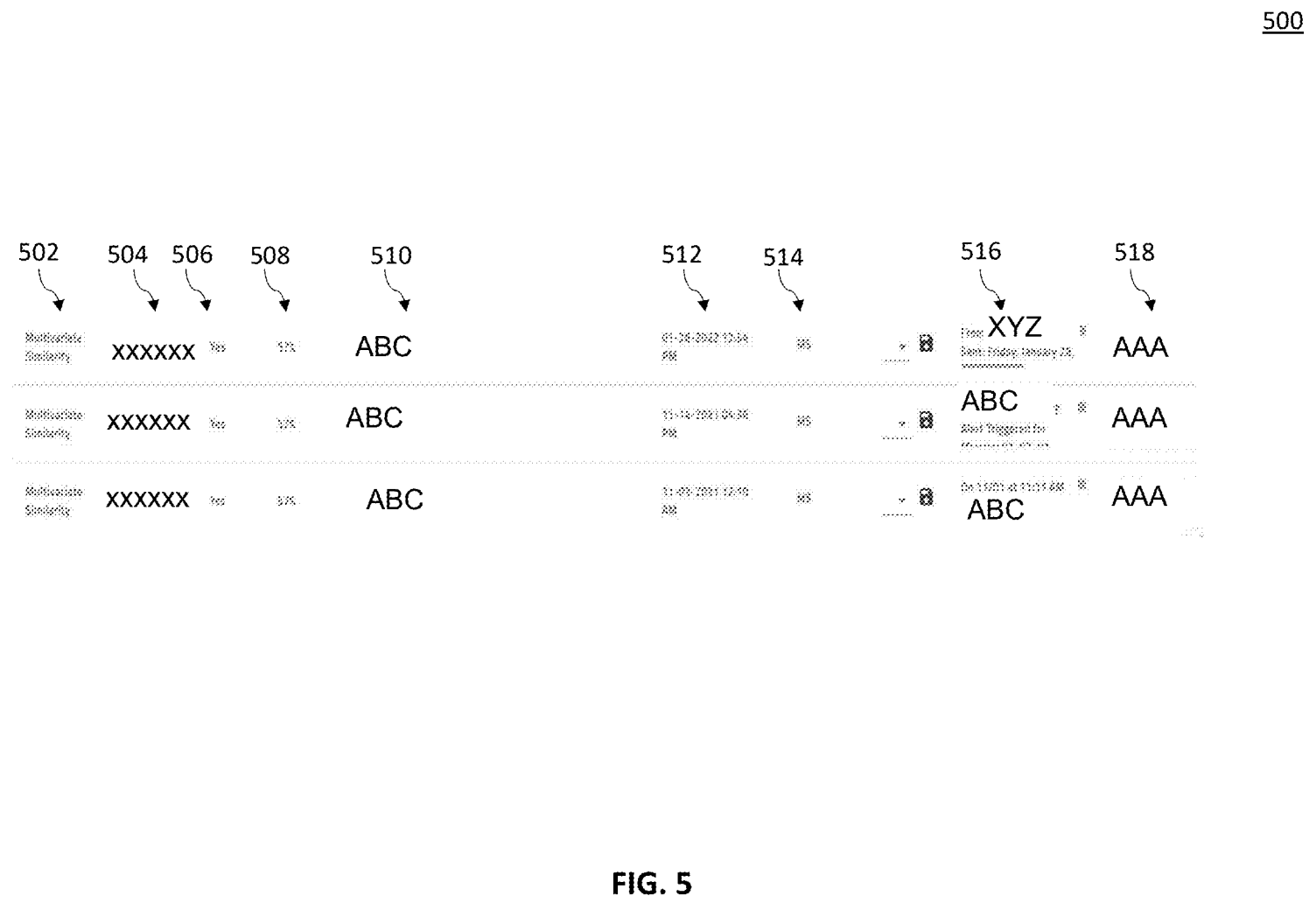

FIG. 5 may depict an exemplary output 500 of historically similar incidents identified utilizing the techniques described herein, according to one or more embodiments. The output 500 may include a chart. The column 502 may represent the respective technique applied to determine the historically similar incident (e.g., the method 400). Column 504 may be a value corresponding to the incident number. This value may represent an instance of a particular historical incident and be utilized as an identifier. Column 506 may indicate whether the incident was a major level incident. Column 508 may indicate the determined similarity score. Column 510 may indicate the name of the configurable item that the incident occurred within. Column 512 may represent the time and date that the respective incident occurred. Column 514 may represent the business segment. The business segments may include a business/payment segment, a capital market segment, and a merchant service segment. Column 516 may represent the data source of the received incident. Column 518 may represent the short descriptions of the respective incidents.

FIG. 6 depicts a flowchart of a method for determining historically similar incidents, according to one or more embodiments.

At step 602, a system may receive a plurality of historical data objects corresponding to a plurality of previous incidents, each of the plurality of historical data objects indicating an occurrence of a previous incident and including previous incident multivariate information. The plurality of historical data objects may be processed. The plurality of processed historical data objects may be converted to a plurality of historical embeddings by utilizing a large language model.

At step 604, a plurality of historical embeddings may be stored in an index, the index being a vector embedding database.

At step 606, a data object indicating an occurrence of a current incident associated with a configurable item may be received, the data object including multivariate information. The multivariate information may include a short description, a business category, a business sub-category, a line of business, and an incident priority. The multivariate information may include multiple data types, the data types including integers and free field text.

At step 608, the data object may be processed. Processing the data object may further include formatting the multivariate information into a first string; and performing preprocessing on the first string. Performing preprocessing on the first string may include applying one or more of a lower casing algorithm, a tokenization algorithm, a punctuation mark removal algorithm, a stop word removal algorithm, a stemming algorithm, or a lemmatization algorithm. The data object may further be converted into a first embedding by utilizing the large language model.

At step 610, a set of historically similar incidents may be identified by applying a Euclidean distance formula to the first embedding and the plurality of historical embeddings.

At step 612, a similarity score for each of the set of historically similar incidents may be determined based on the application of the Euclidean distance formula. The similarity score may be determined by applying exponential decay function to an output of the Euclidean distance formula for the set of historically similar incidents.

Further, the system may apply a normalizing algorithm to the similarity scores; compare the similarity scores to a threshold value; determine a list of historically similar incidents with similarity scores greater than the threshold value; and output the list of historically similar incidents to a user via a graphical user interface (GUI).

Figure 7:
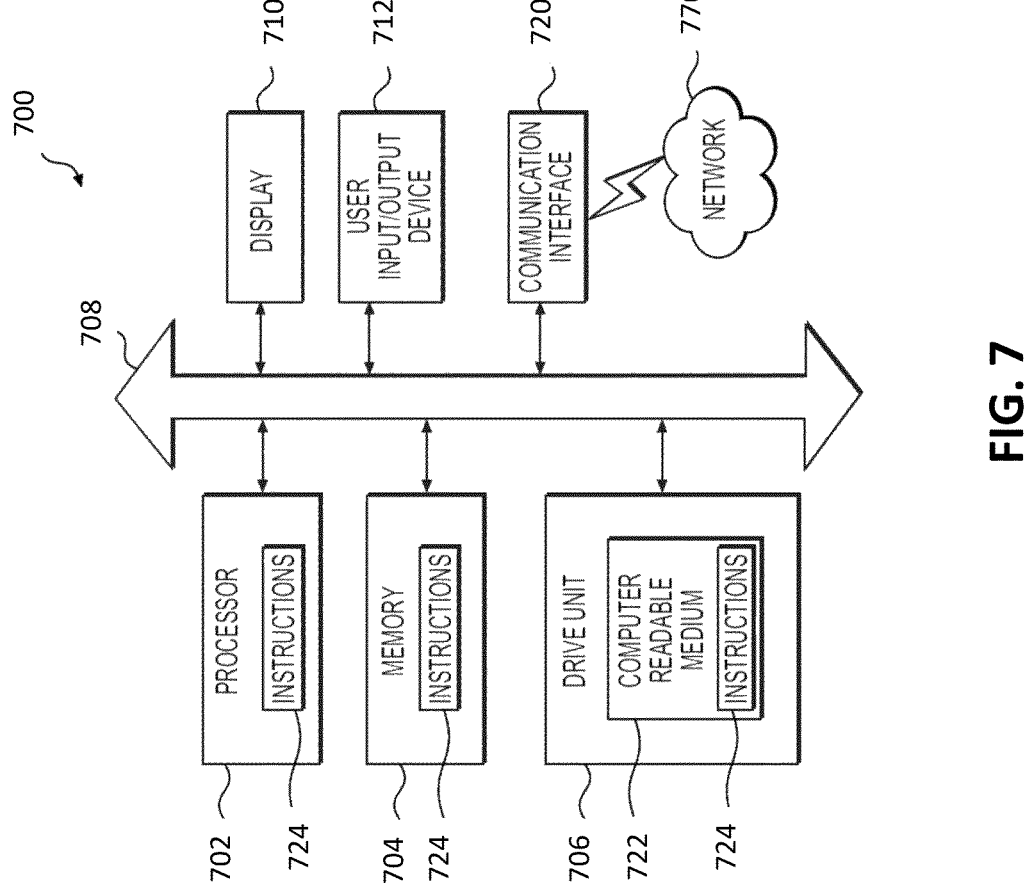
FIG. 7 illustrates a computer system 700 for executing the techniques described herein, according to one or more embodiments of the present disclosure.

As illustrated in FIG. 7, the computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may execute a software program, such as code generated manually or automatically.

The computer system 700 may include a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 704 includes a cache or random-access memory for the processor 702. In alternative implementations, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described herein may be performed by the programmed processor 702 executing the instructions stored in the memory 704. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel payment and the like.

As shown, the computer system 700 may further include a display unit 710, such as a liquid crystal display (LCD), an organic light emitting diode (OLED), a flat panel display, a solid-state display, a cathode ray tube (CRT), a projector, a printer or other now known or later developed display device for outputting determined information. The display 710 may act as an interface for the user to see the functioning of the processor 702, or specifically as an interface with the software stored in the memory 704 or in the drive unit 706.

Additionally or alternatively, the computer system 700 may include an input device 712 configured to allow a user to interact with any of the components of system 700. The input device 712 may be a number pad, a keyboard, or a cursor control device, such as a mouse, or a joystick, touch screen display, remote control, or any other device operative to interact with the computer system 700.

The computer system 700 may also or alternatively include a disk or optical drive unit 706. The disk drive unit 706 may include a computer-readable medium 722 in which one or more sets of instructions 724, e.g., software, can be embedded. Further, the instructions 724 may embody one or more of the methods or logic as described herein. The instructions 724 may reside completely or partially within the memory 704 and/or within the processor 702 during execution by the computer system 700. The memory 704 and the processor 702 also may include computer-readable media as discussed above.

In some systems, a computer-readable medium 722 includes instructions 724 or receives and executes instructions 724 responsive to a propagated signal so that a device connected to a network 770 can communicate voice, video, audio, images, or any other data over the network 770. Further, the instructions 724 may be transmitted or received over the network 770 via a communication port or interface 720, and/or using a bus 708. The communication port or interface 720 may be a part of the processor 702 or may be a separate component. The communication port 720 may be created in software or may be a physical connection in hardware. The communication port 720 may be configured to connect with a network 770, external media, the display 710, or any other components in system 700, or combinations thereof. The connection with the network 770 may be a physical connection, such as a wired Ethernet connection or may be established wirelessly as discussed below. Likewise, the additional connections with other components of the system 700 may be physical connections or may be established wirelessly. The network 770 may alternatively be directly connected to the bus 708.

While the computer-readable medium 722 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 722 may be non-transitory, and may be tangible.

The computer-readable medium 722 can include a solid-state memory such as a memory card or other package that houses one or more non-volatile read-only memories. The computer-readable medium 722 can be a random-access memory or other volatile re-writable memory. Additionally or alternatively, the computer-readable medium 722 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 700 may be connected to one or more networks 770. The network 770 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 770 may include wide area networks (WAN), such as the Internet, local area networks (LAN), campus area networks, metropolitan area networks, a direct connection such as through a Universal Serial Bus (USB) port, or any other networks that may allow for data communication. The network 770 may be configured to couple one computing device to another computing device to enable communication of data between the devices. The network 770 may generally be enabled to employ any form of machine-readable media for communicating information from one device to another. The network 770 may include communication methods by which information may travel between computing devices. The network 770 may be divided into sub-networks. The sub-networks may allow access to all of the other components connected thereto or the sub-networks may restrict access between the components. The network 770 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for finding historically similar incidents in a system, the method comprising:
   receiving a plurality of historical data objects corresponding to a plurality of previous incidents, each of the plurality of historical data objects indicating an occurrence of a previous incident and including previous incident multivariate information;
   processing the plurality of historical data objects;
   converting the plurality of processed historical data objects to a plurality of historical embeddings by utilizing a large language model;
   storing the plurality of historical embeddings in an index, the index being a vector embedding database;
   receiving a data object indicating an occurrence of a current incident associated with a configurable item, the data object including multivariate information, the multivariate information including multiple data types, the data types including integers, free field text, and categories/subcategories;
   processing the data object;
   converting the data object into a first embedding by utilizing the large language model;
   identifying a set of historically similar incidents by applying a Euclidean distance formula to the first embedding and the plurality of historical embeddings;
   determining a similarity score for each of the set of historically similar incidents based on the application of the Euclidean distance formula; and
   outputting to a display, a chart with information regarding the set of historically similar incidents, wherein the information includes indications regarding severities of the set of historically similar incidents, and the similarity scores of the set of historically similar incidents.

2. The method of claim 1, wherein the multivariate information includes a short description, a business category, a business sub-category, a line of business, and an incident priority.

3. The method of claim 1, wherein processing the data object includes:
   formatting the multivariate information into a first string; and
   performing preprocessing on the first string.

4. The method of claim 3, wherein performing preprocessing on the first string includes applying one or more of a lower casing algorithm, a tokenization algorithm, a punctuation mark removal algorithm, a stop word removal algorithm, a stemming algorithm, or a lemmatization algorithm.

5. The method of claim 1, wherein the similarity score is determined by applying exponential decay function to an output of the Euclidean distance formula for the set of historically similar incidents.

6. The method of claim 1, further including:
   applying a normalizing algorithm to the similarity scores;

comparing the similarity scores to a threshold value;

determining a list of historically similar incidents with similarity scores greater than the threshold value; and outputting the list of historically similar incidents to a user via a graphical user interface (GUI).

7. A system for finding historically similar incidents in a system, the system comprising:

a memory having processor-readable instructions stored therein; and at least one processor configured to access the memory and execute the processor-readable instructions to perform operations including:

receiving a plurality of historical data objects corresponding to a plurality of previous incidents, each of the plurality of historical data objects indicating an occurrence of a previous incident and including previous incident multivariate information;

processing the plurality of historical data objects;

converting the plurality of processed historical data objects to a plurality of historical embeddings by utilizing a large language model;

storing the plurality of historical embeddings in an index, the index being a vector embedding database;

receiving a data object indicating an occurrence of a current incident associated with a configurable item, the data object including multivariate information, the multivariate information including multiple data types, the data types including integers, free field text, and categories/subcategories;

processing the data object;

converting the data object into a first embedding by utilizing the large language model;

identifying a set of historically similar incidents by applying a Euclidean distance formula to the first embedding and the plurality of historical embeddings; and determining a similarity score for each of the set of historically similar incidents based on the application of the Euclidean distance formula; and outputting a signal configured to display on a display a chart information regarding the set of historically similar incidents, wherein the information includes indications regarding severities of the set of historically similar incidents, and the similarity scores of the set of historically similar incidents.

8. The system of claim 7, wherein the multivariate information includes a short description, a business category, a business sub-category, a line of business, and an incident priority.

9. The system of claim 7, wherein processing the data object includes:

formatting the multivariate information into a first string; and performing preprocessing on the first string.

10. The system of claim 9, wherein performing preprocessing on the first string includes applying one or more of a lower casing algorithm, a tokenization algorithm, a punctuation mark removal algorithm, a stop word removal algorithm, a stemming algorithm, or a lemmatization algorithm.

11. The system of claim 7, wherein the similarity score is determined by applying exponential decay function to an output of the Euclidean distance formula for the set of historically similar incidents.

12. The system of claim 7, further including:

applying a normalizing algorithm to the similarity scores;

comparing the similarity scores to a threshold value;

determining a list of historically similar incidents with similarity scores greater than the threshold value; and outputting the list of historically similar incidents to a user via a graphical user interface (GUI).

13. A non-transitory computer readable medium storing processor-readable instructions which, when executed by at least one processor, cause the at least one processor to perform operations including:

receiving a plurality of historical data objects corresponding to a plurality of previous incidents, each of the plurality of historical data objects indicating an occurrence of a previous incident and including previous incident multivariate information;

processing the plurality of historical data objects;

converting the plurality of processed historical data objects to a plurality of historical embeddings by utilizing a large language model;

storing the plurality of historical embeddings in an index, the index being a vector embedding database;

receiving a data object indicating an occurrence of a current incident associated with a configurable item, the data object including multivariate information, the multivariate information including multiple data types, the data types including integers, free field text, and categories/subcategories;

processing the data object;

converting the data object into a first embedding by utilizing the large language model;

identifying a set of historically similar incidents by applying a Euclidean distance formula to the first embedding and the plurality of historical embeddings;

determining a similarity score for each of the set of historically similar incidents based on the application of the Euclidean distance formula; and outputting a signal configured to cause a display to display a chart including information regarding the set of historically similar incidents, wherein the information includes indications regarding severities of the set of historically similar incidents, and the similarity scores of the set of historically similar incidents.

14. The non-transitory computer readable medium of claim 13, wherein the multivariate information includes a short description, a business category, a business sub-category, a line of business, and an incident priority.

15. The non-transitory computer readable medium of claim 13, wherein processing the data object includes:

formatting the multivariate information into a first string; and performing preprocessing on the first string.

16. The non-transitory computer readable medium of claim 15, wherein performing preprocessing on the first string includes applying one or more of a lower casing algorithm, a tokenization algorithm, a punctuation mark removal algorithm, a stop word removal algorithm, a stemming algorithm, or a lemmatization algorithm.

17. The non-transitory computer readable medium of claim 13, wherein the similarity score is determined by applying exponential decay function to an output of the Euclidean distance formula for the set of historically similar incidents.

18. The non-transitory computer readable medium of claim 13, further including:

applying a normalizing algorithm to the similarity scores;

comparing the similarity scores to a threshold value;

determining a list of historically similar incidents with similarity scores greater than the threshold value; and outputting the list of historically similar incidents to a user via a graphical user interface (GUI).

19. The method of claim 1, wherein the processing the data object further comprises:

extracting the multivariate information from the multiple data types; and converting the extracted multivariate information into a concatenated string;

wherein converting the data object into a first embedding by utilizing the large language model comprises:

inputting the concatenated string into the large language model.

20. The system of claim 7, wherein the processing the data object further comprises:

extracting the multivariate information from the multiple data types; and converting the extracted multivariate information into a concatenated string;

wherein converting the data object into a first embedding by utilizing the large language model comprises:

inputting the concatenated string into the large language model.

* * * * *